United States Patent Office 2,749,371
Patented June 5, 1956

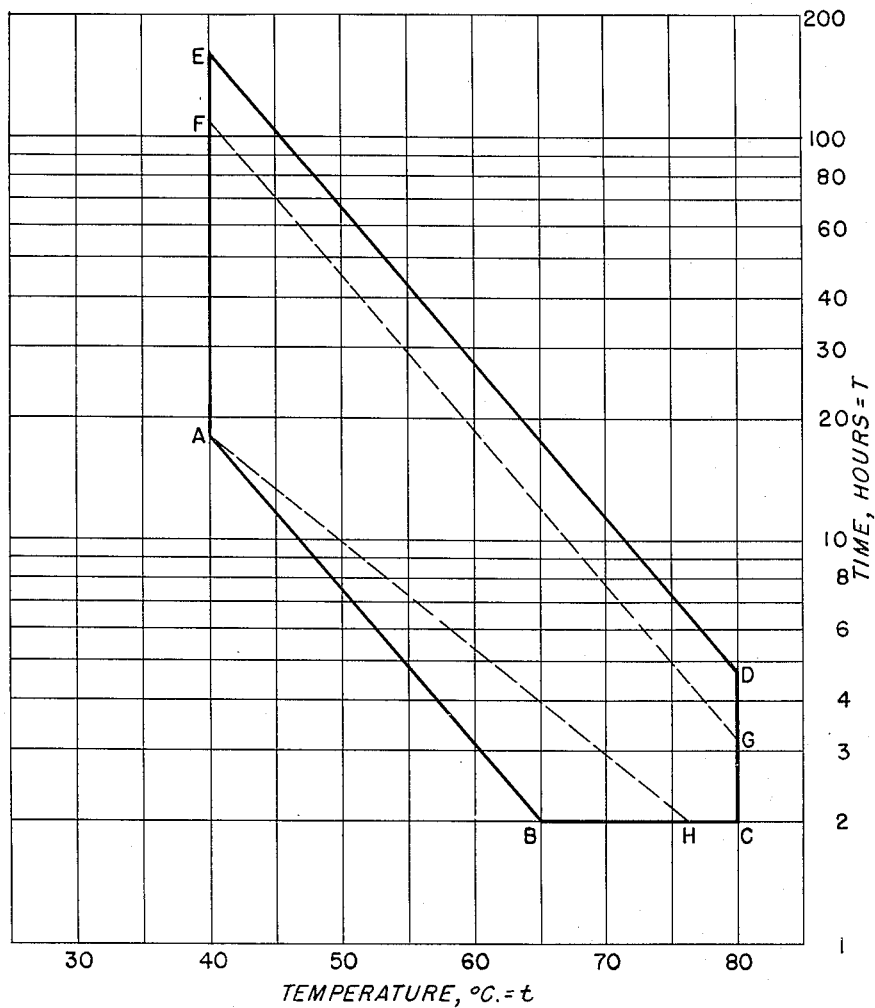

2,749,371

HYDROGENATION OF MONOSACCHARIDES

Leo Kasehagen, West Chester, Pa., assignor to Atlas Powder Company, Wilmington, Del., a corporation of Delaware Application April 3, 1952, Serial No. 280,442

6 Claims. (Cl. 260—635)

This invention relates to a novel chemical process for producing a composition of matter. More specifically it relates to a viscous, cloud-free humectant syrup and to a process for its production by alkaline treatment of monosaccharides or mixtures thereof such as for instance; glucose, invert sugar, xylose and the like, followed by substantial neutralization, catalytic hydrogenation and purification.

It is an object of the present invention to provide a process for the production of non-gelling, non-crystallizing, high viscosity polyol syrup.

It is a further object of the present invention to provide a process for the production of mannitol by the alkaline treatment and catalytic hydrogenation of glucose.

The above and other objects will become apparent in the course of the following description and the appended claims.

The theoretical product resulting from the reduction of a monosaccharide is the corresponding polyol. Thus from glucose the primary and theoretical product is, sorbitol, a solid, white crystalline material. It is well-known that by catalytic hydrogenation under mild conditions this reduction can be carried out successfully, and indeed this reaction is operated commercially on a large scale to make a very pure sorbitol. Similarly, invert sugar when hydrogenated catalytically under mild conditions yields a mixture of sorbitol and mannitol. This occurs because invert sugar is a mixture of glucose, which hydrogenates to sorbitol, and fructose, which hydrogenates to sorbitol and mannitol.

It is also possible to hydrogenate monosaccharides, such as glucose and the like, under drastic conditions of temperature such that extensive splitting of the carbon chain occurs, and the product consists largely of lower molecular weight polyhydric alcohols, as glycerine and glycols. Reactions of such a type are commercialized in the German "Glycerogen" process (FIAT Final Report No. 872).

By proper choice of conditions, hexoses, particularly glucose and invert sugar, have been reduced electrolytically to produce complex mixtures of hexitols and related polyols, but not including polyhydric alcohols of 3 carbon atoms or less which would result from the splitting of the carbon chain. Such complex mixtures, after removal of the readily crystallizable mannitol, form non-gelling, non-crystallizing syrups of wide utility as humectant and conditioning agents. The production of such syrups by electrolytic reduction has been the subject of a number of patents, of which U. S. Patent 2,289,189, may be considered typical.

The present invention is directed to a process for preparing non-crystallizing polyol syrups, of the type heretofore produced electrolytically, by catalytic hydrogenation. In accordance with the invention a monosaccharide is treated with alkali in aqueous solution, and the product of this treatment is hydrogenated under mild conditions. The conditions of the alkali treatment are such that the monosaccharide is converted to a complex mixture of saccharides and/or saccharide-like materials, which, when hydrogenated under mild conditions, yield as the desired product a non-gelling, non-crystallizing syrup. The chemical reactions occurring during the alkali treatment are not understood and no satisfactory methods exist for analyzing the complex mixture which results from the treatment. When this complex mixture resulting from the alkali treatment is hydrogenated under mild conditions, the reducing sugar groups are hydrogenated to alcohol groups and the product is a complex mixture of polyhydric alcohols. Here again the exact nature of the mixture is not known, and no method of analysis exists for determining all the individual constituents of the mixture. When certain monosaccharides, particularly glucose or invert sugar, are used as the raw material, one or more of the constituents of the mixture, such as mannitol, may be readily crystallized and removed from the mixture, and it is to be understood that this removal of easily crystallizable compounds, when necessary, is part of the process.

The complex mixture of polyhydric alcohols, after removal of readily crystallizable components, such as mannitol, is a non-crystallizing, non-gelling hygroscopic syrup of great usefulness. A major constituent of this syrup, and the only one which is easily determined by analysis, is sorbitol. Concentrated aqueous solutions of pure sorbitol have a great tendency to gel or solidify, and it is obvious that if the complex syrup resulting from the present process is to be non-gelling and non-crystallizing, there must be an upper limit on the amount of sorbitol which the polyol mixture may contain.

It has been found that if the conditions of the process are so chosen that the syrup which is the final product has a "Pyridine Number" no greater than about 60, gelation or crystallization thereof will not occur. "Pyridine Number" (hereinafter abbreviated PN) as used throughout this specification is an index of the sorbitol content of sorbitol-containing material. This index is determined by crystallizing sorbitol from sorbitol-containing products in the form of a sorbitol-pyridine complex, filtering the crystalline complex, adding water to it to decompose the complex into pyridine and sorbitol, driving off the pyridine by vacuum distillation with water, dehydrating the sorbitol residue and weighing it as sorbitol. The procedure is specific for sorbitol, since no other polyhydric material, such as sugar, mannitol, etc., exhibits the same behavoir with pyridine. The PN is the weight of sorbitol crystallized from anhydrous pyridine as above, multiplied by 100 and divided by the weight of the sample (ash, moisture and sugar free). The PN for pure sorbitol is about 95. The preparation of the sorbitol-pyridine complex and its treatment to free sorbitol therefrom is described by Strain in J. Am. Chem. Soc., vol. 56, page 1757 (1934). The PN of a sorbitol-containing product is an index of its crystallizing tendency from relatively highly concentrated aqueous solutions. The higher the PN the greater the crystallizing tendency, and at PN's substantially above 60 the product of the process no longer has the desirable property of being non-gelling and non-crystallizing.

The second stage of the process is a hydrogenation under mild, non-transforming conditions. Suitable conditions are those under which glucose is hydrogenated to sorbitol of high purity. Temperatures in excess of 170° C. do not meet this criterion, and the preferred temperature range is 140–160° C. Lower temperatures may be employed at some sacrifice in reaction rate and temperatures as low as 120° C. have been found satisfactory. The solutions may be hydrogenated at pressures as low as 500 pounds per square inch (p. s. i.), although economic considerations of reaction rate usually dictate the use of pressures in excess of 1000 p. s. i. Preferred operating pressures are in the range of 1500 to 2000 p. s. i. Higher pressures, without limit, may be employed, but it is found that there is little gain in reaction efficiency and there is, therefore, no justification for the installation of costly super-pressure equipment to permit operation at pressures significantly above 2000 p. s. i.

It is essential that the hydrogenation be carried out at a pH no higher than 7, since at higher pH's some splitting of the carbon chain occurs, yielding polyhydric materials of low molecular weight. Thus an essential feature of the process is a neutralization of the excess alkali following the alkali treatment. The neutralization may be accomplished in any known manner. Thus, any suitable acid such, for example, as sulfuric, hydrochloric, phosphoric, acetic, or the like acid may be added. Alternatively, part of the solution may be passed through a cation exchange bed in the hydrogen cycle and the acid effluent blended with the remainder of the solution to yield the desired pH. In certain cases it may be desirable to neutralize by removing all ionic compounds by a complete demineralization process in successive cation-anion exchange units, in manner well known in the art. All such methods of neutralization are within the purview of the invention. The pH of the solution is preferably adjusted to a value between 6 and 7, although somewhat lower pH values, down to 5.0, may be employed without deleterious effects.

Any catalyst suitable for the direct hydrogenation of glucose to sorbitol may be used, a reduced supported nickel catalyst being preferred. The hydrogenation may be carried out batch-wise or continuously, as, for example, by the continuous process described in applicant's application No. 32,845. In batch system the hydrogenation is continued until reducing sugar is essentially no longer present. In continuous system a feed rate is used as such that there is essentially no reducing sugar in the product leaving the system.

The conditions of time, temperature and alkali concentration employed in the alkali treatment step of the process of the invention are sufficiently mild that a portion of the sugar remains untransformed. Accordingly, if the monosaccharide used as the raw material is one which normally hydrogenates to a readily crystallizable polyhydric alcohol, this crystallizable material will be present in the product and its removal by obvious means, such as crystallization and filtration, is necessary to produce a non-gelling, non-crystallizing syrup and is an essential part of the process. For example, if fructose is a raw material, mannitol may be expected in the product and must be filtered out to produce a non-gelling, non-crystallizing syrup.

If glucose is a raw material, removal of mannitol from the product will again be necessary. This results from the fact that one of the reactions which the glucose undergoes upon treatment with alkali is the well known Lobry de Bruyn isomerization, in which glucose is partially converted to fructose and mannose, both of which yield mannitol as normal hydrogenation products. It must be emphasized that the Lobry de Bruyn isomerization is not the only reaction which glucose undergoes during the alkali treatment. If it were, then the products of the process would be mannitol and high purity sorbitol of PN 95. The process of the invention, on the contrary, yields mannitol and a viscous, non-gelling, non-crystallizing syrup of PN 60 or less. Reference is made to U. S. Patent 2,116,665 for a description of means for separating readily crystallizable hexitols such as mannitol, from polyhydric alcohol mixtures of the type here under consideration.

From the above description it may be seen that the composition of the final product is primarily controlled by the alkali treatment. The hydrogenation conditions are selected to minimize any change other than the direct addition of hydrogen to reduce carbonyl groups contained in the alkali-transformed product.

The product of the alkali treatment is a function of the conditions during the treatment. Broadly, the alkali employed in treating the aqueous solutions of the monosaccharide may be the hydroxide of any of the alkali metals or of the alkaline earth metals. Of these calcium hydroxide is most highly preferred because of its efficiency in transforming the monosaccharides into desired complex mixtures for hydrogenation, its ready availability and its low cost. Sodium hydroxide though slightly less efficient as an isomerization agent is very effective and, because of its more convenient liquid form, may in some instances be preferred to calcium hydroxide. Operative concentrations of the alkaline agent in the process of the invention range from 0.15 to 0.4 hydroxyl equivalents per liter of monosaccharide solution being treated. When the agent is calcium hydroxide it is preferred to employ not over 0.3 hydroxyl equivalent per liter since larger amounts are not absolutely necessary and merely add to the cost of neutralizing and to the ash forming constituents to be later removed from high quality products.

The process of the invention is applicable to any 5 or 6 carbon monosaccharide such as xylose, glucose, fructose, invert sugar, mannose, or the like. From the standpoint of availability and desired properties of the resulting polyol syrup the preferred monosaccharides are glucose and invert sugar. These may most conveniently be subjected to the alkali treatment in aqueous solutions of suitable concentrations for subsequent hydrogenation, i. e., in solutions containing from 40% to 70% of said sugar. Alkali treatment of the sugar in solutions of lower concentration, i. e., in concentrations ranging upwards from 25% by weight are equally effective as far as transformation of the sugar is concerned, but such lower concentrations are not preferred since they involve the introduction of objectionably high ash to sugar ratios and require later costly evaporation processes.

The alkali treatment may be carried out at any temperature between about 40° C. and about 80° C., with suitable control of the time factor as more fully discussed hereinafter. Preferably temperatures of from 50° C. to 65° C. are employed.

The time required for the alkali to transform the sugar into products which on hydrogenation will yield a syrup of PN below about 60 is primarily a function of the temperature, and to a lesser extent of the nature and kind of alkali used. The time can best be defined by reference to the drawing in which the abscissae represent temperature, in degrees centigrade, and the ordinates represent logarithms of the time in hours. For any given temperature between the before-defined limits of 40° C. and 80° C., the time of alkali treatment in accordance with the invention lies between the values where the curves ED and ABC, respectively, cut the abscissa representing that temperature. This may be more simply stated by saying that any point within the polygon ABCDE represents a time-temperature relation for alakli treatment which is within the scope of the invention.

It will be recognized by those skilled in the art that when the alkali concentration is in the upper portion of the before-defined range the degree of sugar transformation will be greater for given time-temperature conditions than when the alkali concentration is lower. Similarly, when neutralization is effected by demineralization, the final PN tends to be higher than when acid is added. If demineralization is to be employed times and/or temperatures of alkali treatment in the upper portions of the indicated ranges are selected. The PN of the resulting reduced polyol can thus be controlled over a considerable range by proper choice of alkali strength, the temperature and time of alkali treatment and the method of neutralization, all within the operative limits defined hereinbefore.

It has been found, furthermore, that invert sugar undergoes its alkaline transformation more readily than do some other monosaccharides and it is preferred, when employing that sugar, to employ less than the maximum times defined by the polygon ABCDE, and to select time-temperature conditions falling within the polygon ABCGF. Conversely, glucose is rather more resistant to alkali transformation than is invert sugar, especially at the higher temperatures so that longer times of alkali treatment than the minimum defined by the polygon ABCDE are preferred in the higher temperature ranges, and it is preferred, for glucose, to select time-temperature conditions falling within the polygon AHCDE.

The boundaries of the several polygons shown in the drawing and mentioned above are fixed by lines conforming to the following equations:

| Line | Equation |
| --- | --- |
| AB | $\log T = 2.80 - 0.0385 t$ |
| BHC | $T = 2$ |
| CGD | $t = 80$ |
| EFA | $t = 40$ |
| ED | $\log T = 3.75 - 0.0385 t$ |
| FG | $\log T = 3.58 - 0.0385 t$ |
| AH | $\log T = 2.30 + 0.0261 t$ |

The following examples describe in detail the preparation of a number of specific polyhydric alcohol syrups of low PN in accordance with the invention. They are to be considered as illustrative only and not as defining limits of operability, which have been fully set forth hereinbefore.

Example I 250 grams of glucose is dissolved in distilled water to give a solution of 48% concentration. This solution is heated to 65° C. and barium hydroxide added in quantity sufficient to make the concentration of the barium hydroxide 0.2 mol/liter. The solution is agitated and maintained at 65° C. for 6 hours after the addition of the barium hydroxide. It is then cooled and neutralized to a pH of 6.8 with sulfuric acid. The precipitated barium sulfate is filtered out. A quantity of activated supported nickel catalyst containing 5 grams of nickel is added. The slurry is introduced into a 3-liter rocking autoclave, and hydrogen admitted to a pressure of 1500 p. s. i. The autoclave is heated to a temperature of 150° C. in one hour and held at this temperature for 2½ hours more. Pressure rises to about 1800 p. s. i. and then declines to about 1600 during the hydrogenation. The autoclave is then cooled, emptied, and the catalyst filtered from the product. The filtrate is then concentrated under vacuum on a hot water bath to remove a part of the water. The concentrate is taken up in warm aqueous methanol so adjusted that the composition of the solvent is 90% methanol—10% water, and the weight of the solvent is 3 times the weight of the solids in the concentrate. This solution is cooled to 20° C. and held overnight. The mannitol which crystallizes is filtered out. The filtrate is concentrated on a water bath under vacuum to remove methanol and adjusted to a water percentage of 16%. The resulting syrup is viscous, non-crystallizing and non-gelling, and analysis shows it to have a PN of 32 and essentially no reducing sugar.

Example II 500 cc. of 52% aqueous glucose solution is heated to 45° C. 8 grams of a 50% caustic soda solution is added to give sodium hydroxide equal to 0.2 mol/liter. After holding for 48 hours at 45° C., sulfuric acid is added to lower the pH to 6.4 and the solution is cooled. Reduced supported nickel catalyst is added in amount sufficient to make the nickel 2% of the glucose taken. Hydrogenation is carried out as in Example I. Mannitol is removed and the syrup prepared as in Example I. The syrup is analyzed and found to have a reducing sugar content of 0.04% and a PN of 56. It does not gel or postcrystallize. Instead of 8 grams of 50% caustic soda solution, a solution of 5.6 grams of potassium hydroxide in 10 ml. of water may be used with equivalent results.

Example III 8.5 liters of 50% glucose solution is heated to 65° C. A water slurry of lime is added in quantity equivalent to a Ca(OH)$_2$ concentration of 0.1 mol per liter. The temperature is maintained for 6 hours at 65° C. Sulfuric acid is added to neutralize the lime and the solution is cooled. The pH is 7. An activated nickel on diatomaceous earth catalyst is added in the proper amount to make the nickel equal 2.3% of the glucose taken. The sugar solution with catalyst is pumped into a 5 gallon high pressure autoclave having an internal agitator rotating at 250 R. P. M. Hydrogen is admitted to a pressure of 1000 p. s. i. and held constant throughout the run. The reactor is heated to 150° C. in 70 minutes and held at this temperature for 4 hours. At the end of this period the contents of the autoclave are discharged and cooled. The catalyst is filtered out and the filtrate concentrated to remove most of the water. Warm ethanol, methanol and water are added to give the following composition:

| | Parts by weight |
| --- | --- |
| Polyhydric alcohol | 100 |
| Ethanol | 75 |
| Methanol | 75 |
| Water | 30 |

This solution is allowed to cool to 20° C. over a 16-hour period and held at this temperature for an additional 6 hours. The mannitol which has crystallized is filtered out and the filtrate is concentrated to remove alcohol and water. The water content of the final syrup is adjusted to 16%. This syrup has a PN of 41 and a reducing sugar content of 0.17%. It is non-gelling and non-postcrystallizing.

Example IV 20 gallons of 50% invert sugar solution is heated to 60° C. A water slurry of calcium hydroxide is added equivalent to a Ca(OH)$_2$ concentration of 0.085 mol/liter. After agitating for 6 hours at 60° C., the sugar solution is cooled and neutralized with sulfuric acid to a pH of 6.4. Reduced nickel on diatomaceous earth catalyst is added to give a nickel concentration equal to 1.7% of the invert sugar taken.

Hydrogenation is carried out in continuous system according to the process described in pending application Serial No. 32,845. Two reactors of 3.5 inch inside diameter by 6 feet high are connected in series. Pressure is maintained at 1600 p. s. i. Temperatures in both reactors are held at 140° C. Hydrogen is circulated through the reactors (entering the bottom of the first through a perforated distributing tube) at a rate of 1290 cubic feet per hour (measured at 0° C. and 1 atmosphere pressure). The above sugar solution and catalyst is pumped through this reaction system at a rate of 9.4 liters/hour. The product leaving the system has a reducing sugar percentage of 0.08% on a dry basis. Catalyst is filtered from the product, and the product is concentrated, the mannitol removed, and the syrup prepared as described in Example III. This syrup is non-gelling and non-postcrystallizing, and analysis shows it to have a PN of 49.

Example V 40,000 lbs. of glucose is dissolved in 4800 gallons of water to make a 50% solution. This is heated to 70° C. and 1040 lbs. of 50% caustic soda solution added. This is equivalent to an NaOH addition of 0.2 mol/liter of solution. The temperature is maintained at 70° C. with agitation for 6 hours. The solution is then cooled and neutralized with sulfuric acid to a pH in the range of 6.5–7.0. These alkali treatments are performed in batches of approximately 1200 gallons each and then combined. Reduced nickel catalyst (supported on diatomaceous earth) is added in sufficient quantity to make the nickel equal 2.0% of the glucose taken.

Hydrogenation is carried out by the process described in application Ser. No. 32,845, now U. S. Patent 2,642,462, using a series of five reactors each 12 inches inside diameter by 15 feet high. The reactors are held at 160° C. temperature and a hydrogen pressure of 1600 p. s. i. is maintained. Hydrogen is circulated through the reactors at a rate of 5.8 cubic feet per minute (measured at room temperature and reactor pressure).

The sugar solution prepared as described above is pumped through this reaction system at a rate ranging from 2.5 to 3.0 gallons per minute. Reducing sugar in the product leaving the fifth reactor is less than 0.1%, dry basis. Catalyst is filtered out and the solution concentrated in a vacuum kettle. Methanol, ethanol and water are added to the concentrate to give a mixture of the composition described under Example III. Mannitol is crystallized out in large crystallizers using the cooling cycle described in Example III. The crystallized mannitol is filtered out in a plate and frame filter press. The filtrate is concentrated in a vacuum kettle to remove alcohol and water. The water content is then adjusted to 16%. The resulting syrup is found to be non-gelling and non-crystallizing, and its PN is found to be 55.

*Example VI*

3600 gallons of invert sugar of 52.7% concentration is prepared. This is heated to 60° C. and to it is added a slurry of 157 lbs. unslaked lime (assay 91% CaO) in 78 gallons of water. The solution is agitated for 6 hours at 60° C. It is then cooled and neutralized to pH's in the range 6.3–6.8. Actually the alkali treatment is carried out in three separate batches and then the batches combined. Reduced supported nickel catalyst is added to give a nickel percentage of 2.0, based on the sugar taken. Hydrogenation is carried out in the plant scale equipment described in Example V. The temperatures of the reactors are held at 150° C., and the hydogen pressure at 1600 p. s. i. Hydrogen is circulated through the reactors at 5.5 cubic feet per minute, measured at reactor pressure and room temperature. The above-described alkali-treated sugar solution with suspended catalyst is pumped through this reactor system at rates ranging from 3.3 to 3.7 gallons per minute. Reducing sugar in the product leaving the last reactor is less than 0.1%, dry basis. The catalyst is filtered out and the mannitol is removed and the syrup prepared as described in Example V. The syrup is non-gelling and non-crystallizing and has a PN of 50.

*Example VII*

To 20 gallons of 50% glucose solution a water slurry of calcium hydroxide is added to produce a calcium hydroxide concentration of 0.085 mol/liter. The mixture is heated to 65° C. and agitated at that temperature for 6 hours. The resulting solution is cooled and neutralized with sulfuric acid to a pH of 6.9. A catalyst consisting of reduced nickel on diatomaceous earth is added to give a nickel concentration of 2% based on the glucose taken.

The solution is hydrogenated using the continuous process described in pending application Ser. No. 32,845. Two reactors of 3.5 inches inside diameter by 6 feet high are connected in series. Pressure is maintained at 1600 p. s. i. Temperatures in both reactors are held at 120° C. Hydrogen is circulated through the reactors (entering the bottom of the first through a perforated distributing tube at a rate of 1040 cubic feet/hour measured at 0° C. and 1 atmosphere pressure). The above slurry of catalyst in transformed glucose solution is pumped through this reaction system at a rate of 8.9 liters/hour. The product leaving the system has a reducing sugar content of less than 0.1% on a dry basis. Catalyst is filtered from the product, the product is concentrated, the mannitol removed and the syrup prepared as described in Example III. This syrup is non-gelling and non-crystallizing, and by analysis has a PN of 59.

*Example VIII*

To 20 gallons of 50% glucose a water slurry of calcium hydroxide is added to produce a calcium hydroxide concentration of 0.085 mol/liter. The mixture is heated to 50° C. and held at that temperature with agitation for 16 hours. The sugar solution is then cooled and neutralized with sulfuric acid to a pH of 6.6. A catalyst consisting of reduced nickel on diatomaceous earth is added to give a nickel concentration of 2% based on the glucose taken.

The solution is hydrogenated using the continuous process described in pending application Serial No. 32,845. Two reactors of 3.5 inches inside diameter by 6 feet high are connected in series. Pressure is maintained at 1600 p. s. i. Temperatures in both reactors are held at 140° C. Hydrogen is circulated through the reactors (entering the bottom of the first through a perforated distributing tube at a rate of 1270 cubic feet/hour measured at 0° C. and 1 atmosphere pressure). The above slurry of catalyst in transformed glucose solution is pumped through this reaction system at a rate of 8.1 liters/hour. The product leaving the system has a reducing sugar content of less than 0.1% on a dry basis. Catalyst is filtered from the product, the product is concentrated, the mannitol removed and the syrup prepared as described in Example III. This syrup is non-gelling and non-crystallizing, and by analysis has a PN of 58.

Products of the process of the invention are humectant syrups of wide utility. They are conditioning agents for flexible glues, tobacco, paper, cosmetics, candy, dentifrices, gelatin, shredded coconut, and the like. The process of the invention offers a real economic advantage over prior art methods of reducing sugar solutions to form non-crystallizing polyol syrups of properties comparable to those here produced.

The process of the invention has been disclosed in its broad aspects and has been specifically exemplified in detail. The invention is not to be deemed as limited otherwise than as indicated by the appended claims.

What is claimed is:

1. The process of preparing a non-gelling, non-crystallizing high viscosity polyol composition which comprises introducing a monosaccharide containing from 5 to 6 carbon atoms and a hydroxide selected from the group consisting of alkali metal and alkaline earth metal hydroxides into water to form a mixture containing from 40 to 70% by weight of monosaccharide and from 0.15 to 0.4 hydroxyl equivalents of said hydroxide per liter; heating the resulting mixture to a temperature of from 40° C. to 80° C.; maintaining the mixture at the said temperature for a time corresponding to a time-temperature point within the polygon ABCDE of the drawing; adjusting the pH of the resulting solution to a value of from 7 to 5.0; and hydrogenating the resulting solution in the presence of a hydrogenation catalyst, at a temperature of from 120° to 170° C. and at a pressure above 500 pounds per square inch.

2. The process of claim 1 wherein the step of adjusting the pH to the said value comprises the addition of an acid.

3. The process of preparing a non-gelling, non-crystallizing, high viscosity polyol composition which comprises introducing invert sugar and a hydroxide selected from the group consisting of alkali metal and alkaline earth metal hydroxides into water to form a mixture containing from 40% to 70% by weight of invert sugar and from 0.15 to 0.30 hydroxyl equivalents of said hydroxide per liter; heating the resulting mixture to a temperature of from 40° C. to 80° C.; maintaining the mixture at the said temperature for a time corresponding to a time-temperature point within the polygon ABCGF of the drawing; adjusting the pH of the resulting solution to a value of from 7 to 5.0; and hydrogenating the resulting solution in the presence of a hydrogenation catalyst, at a temperature of from 120° to 170° C. and at a pressure above 500 pounds per square inch.

4. The process of preparing a non-gelling, non-crystallizing, high viscosity polyol composition which comprises introducing invert sugar and calcium hydroxide into water to form a mixture containing about 50% by weight of invert sugar and about 0.085 mols per liter of calcium hydroxide; heating the mixture to a temperature of from 60° to 65° C.; maintaining the mixture at said temperature for about 6 hours; adding sulfuric acid to the resulting solution to adjust the pH to a value between 6 and 7; and hydrogenating the resulting solution in the presence of a hydrogenation catalyst, at a temperature of from 120° to 170° C. and at a pressure above 500 pounds per square inch.

5. The process of preparing a non-gelling, non-crystallizing, high viscosity polyol composition which comprises introducing glucose and a hydroxide selected from the group consisting of alkali metal and alkaline earth metal hydroxides into water to form a mixture containing from 40 to 70% by weight of monosaccharide and from 0.15 to 0.4 hydroxyl equivalents of said hydroxide per liter; heating the resulting mixture to a temperature of from 40° C. to 80° C.; maintaining the mixture at the said temperature for a time corresponding to a time-temperature point within the polygon AHCDE of the drawing; adjusting the pH of the resulting solution to a value of from 7 to 5.0; and hydrogenating the resulting solution in the presence of a hydrogenation catalyst, at a temperature of from 120° to 170° C. and at a pressure above 500 pounds per square inch.

6. The process of preparing a non-gelling, non-crystallizing, high viscosity polyol composition which comprises introducing glucose and calcium hydroxide into water to form a mixture containing about 50% by weight of glucose and 0.085 mol per liter of calcium hydroxide; heating the mixture to a temperature of from 50° to 55° C.; maintaining the mixture at said temperature for about 16 hours; adding sulfuric acid to the resulting solution to adjust the pH to a value between 6 and 7; and hydrogenating the resulting solution in the presence of a hydrogenation catalyst, at a temperature of from 120° to 170° C. and at a pressure above 500 pounds per square inch.

References Cited in the file of this patent

UNITED STATES PATENTS

| | | |
|---|---|---|
| 2,292,293 | Rose | Aug. 4, 1942 |
| 2,354,664 | Cantor et al. | Aug. 1, 1944 |
| 2,487,121 | Fetzer et al. | Nov. 8, 1949 |